Patented Oct. 26, 1926.

1,604,313

UNITED STATES PATENT OFFICE.

HENRY L. PRESTHOLDT, OF MINNEAPOLIS, MINNESOTA.

CASEIN GLUE.

No Drawing.      Application filed April 17, 1922.   Serial No. 554,202.

My invention provides a new composition of matter herein designated as "casein glue," but which is especially adapted for use in coating materials such as paint, calcimine, and the like, and is adapted to be used, by itself or commingled with other substances such a coloring matter or pigments.

In this improved composition, casein is used as an adhesive base and is commingled with sodium silicate, trisodium phosphate, sodium sulphite, calcium oxide, and magnesium oxide.

I have obtained a highly efficient adhesive for the above noted and other purposes by the use of the following formula:

| | Parts. |
|---|---|
| Casein | 50 to 75 |
| Sodium silicate | 2 to 10 |
| Tri-sodium phosphate | 3 to 15 |
| Sodium sulphite | 3 to 18 |
| Calcium oxide | 6 to 15 |
| Magnesium oxide | 10 to 25 |

The above noted substances are commingled in dry or powder form and are sold in that condition. When the composition is to be used, it will be introduced into water to form an emulsion, and it is then, of course, that the chemical reactions that develop the adhesive qualities of the composition, will take place. After these reactions have taken place, the composition may be mixed with paints or other coating substances or it may be applied in the form of an emulsion. When desired, the color pigments may be added to the dry composition.

The colloids of the casein are brought into aqueous solution by the use of the following chemicals: tri-sodium phosphate, sodium sulphite, and calcium oxide. Calcium oxide unites with casein, forming an insoluble caseinate of lime which imparts to the glue a waterproof quality. Using calcium oxide alone, without the addition of magnesium oxide, would make the glue unworkable, because of the liquid characteristic becoming quickly gelatinous. Magnesium oxide delays this process. Sodium silicate is added for the purpose of reducing the cost.

What I claim is:

An adhesive coating made in accordance with the following formula:

| | Parts. |
|---|---|
| Casein | 50 to 75 |
| Sodium silicate | 2 to 10 |
| Tri-sodium phosphate | 3 to 15 |
| Sodium sulphite | 3 to 18 |
| Calcium oxide | 6 to 15 |
| Magnesium oxide | 10 to 25 |

In testimony whereof I affix my signature.

HENRY L. PRESTHOLDT.